US012621681B2

(12) United States Patent　　　　(10) Patent No.:　US 12,621,681 B2
McCracken et al.　　　　　　　　　(45) Date of Patent:　　　May 5, 2026

(54) IDENTIFYING TELECOMMUNICATIONS NETWORK PERFORMANCE ON ROADWAYS

(71) Applicant: T-Mobile USA, Inc., Bellevue, WA (US)

(72) Inventors: Bill G. McCracken, Lenexa, KS (US); Karen Chantal Castelain, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 250 days.

(21) Appl. No.: 18/359,796

(22) Filed: Jul. 26, 2023

(65) Prior Publication Data

US 2025/0039689 A1　　Jan. 30, 2025

(51) Int. Cl.
| | |
|---|---|
| *H04W 4/00* | (2018.01) |
| *H04B 17/318* | (2015.01) |
| *H04W 4/024* | (2018.01) |
| *H04W 24/02* | (2009.01) |
| *H04W 24/08* | (2009.01) |
| *H04W 64/00* | (2009.01) |

(52) U.S. Cl.
CPC .......... *H04W 24/02* (2013.01); *H04B 17/318* (2015.01); *H04W 4/024* (2018.02); *H04W 24/08* (2013.01); *H04W 64/003* (2013.01)

(58) Field of Classification Search
None
See application file for complete search history.

(56)　　　　References Cited

U.S. PATENT DOCUMENTS

| | | |
|---|---|---|
| 8,504,034 B2 | 8/2013 | Miyake et al. |
| 8,504,035 B2 | 8/2013 | Shin et al. |
| 9,072,027 B2 | 6/2015 | Vasudevan et al. |
| 9,175,969 B2 | 11/2015 | Xie et al. |
| 9,294,337 B2 | 3/2016 | Bollapalli et al. |
| 9,418,351 B2 | 8/2016 | Carr et al. |

(Continued)

FOREIGN PATENT DOCUMENTS

| | | |
|---|---|---|
| CN | 103703842 A | 4/2014 |
| CN | 109922483 B | 12/2020 |

(Continued)

*Primary Examiner* — Bob A Phunkulh

(74) *Attorney, Agent, or Firm* — Perkins Coie LLP

(57)　　　　　ABSTRACT

Systems and methods to identify network performance on paths (e.g., roads, highways, hiking routes, etc.) to enhance a customer's experience with a telecommunications service provider during travel are disclosed. The method includes receiving, such as from a user at a mobile device, a request to generate a user-optimal path having at least a threshold level of network performance indicator (e.g., network coverage strength) from a first to second location. The method includes identifying paths between the locations, wherein each path includes reference points with associated network performance indicators and generating a recommendation for optimal paths selected from the paths based on user preferences, network performance indicators at reference points, a mode of transportation, and a telecommunications service provider associated with the user equipment. A user can then use the generated path to better plan their trip to ensure network performance that conforms to their needs.

20 Claims, 6 Drawing Sheets

(56) References Cited

U.S. PATENT DOCUMENTS

| | | | |
|---|---|---|---|
| 9,479,915 | B2 | 10/2016 | Gupta |
| 9,615,288 | B2 | 4/2017 | Rahman et al. |
| 9,794,809 | B2 | 10/2017 | Chou et al. |
| 9,832,043 | B2 | 11/2017 | Okamoto et al. |
| 9,832,703 | B2 | 11/2017 | Randriamasy et al. |
| 9,942,944 | B2 | 4/2018 | Phuyal et al. |
| 10,015,737 | B2 | 7/2018 | Colban et al. |
| 10,028,213 | B2 | 7/2018 | Colban et al. |
| 10,039,013 | B2 | 7/2018 | Periyasamy et al. |
| 10,420,170 | B2 | 9/2019 | Garg et al. |
| 10,638,400 | B1 | 4/2020 | Xu et al. |
| 10,677,599 | B2 | 6/2020 | Zavesky et al. |
| 10,728,768 | B2 | 7/2020 | Senior |
| 10,735,273 | B2 | 8/2020 | Kaplunov et al. |
| 10,794,715 | B1 * | 10/2020 | Truong .............. G01C 21/3446 |
| 10,833,961 | B1 | 11/2020 | Nalluri et al. |
| 11,240,729 | B1 | 2/2022 | Xu et al. |
| 11,250,946 | B2 | 2/2022 | Schuck et al. |
| 11,271,831 | B2 | 3/2022 | Patil et al. |
| 11,330,448 | B2 | 5/2022 | Khalid |
| 11,425,010 | B2 | 8/2022 | Kwok et al. |
| 11,428,540 | B1 * | 8/2022 | Gray ................. G01C 21/3492 |
| 11,444,851 | B2 | 9/2022 | Young |
| 11,606,716 | B2 | 3/2023 | Yoon |
| 2007/0179709 | A1 * | 8/2007 | Doyle ................ G01C 21/3453 701/417 |
| 2008/0043676 | A1 | 2/2008 | Mousseau et al. |
| 2009/0064255 | A1 | 3/2009 | Jiang et al. |
| 2012/0005023 | A1 | 1/2012 | Graff |
| 2014/0112171 | A1 | 4/2014 | Pasdar |
| 2017/0068245 | A1 * | 3/2017 | Scofield ............. H04B 7/18504 |
| 2017/0323194 | A1 * | 11/2017 | Wang ....................... G06N 5/01 |
| 2020/0286388 | A1 | 9/2020 | Velastri et al. |
| 2020/0296617 | A1 * | 9/2020 | Li ..................... H04W 28/0236 |
| 2021/0215496 | A1 * | 7/2021 | Sese ................... G01C 21/3697 |
| 2022/0113364 | A1 | 4/2022 | Zhou et al. |
| 2022/0377573 | A1 | 11/2022 | Ashworth et al. |
| 2023/0138025 | A1 * | 5/2023 | Mathada ............ G01C 21/3484 701/410 |

FOREIGN PATENT DOCUMENTS

| | | |
|---|---|---|
| CN | 110969833 B | 11/2021 |
| CN | 113973079 B | 5/2023 |
| EP | 2705707 A1 | 3/2014 |
| EP | 2912810 A1 | 9/2015 |
| EP | 3061286 A1 | 8/2016 |
| EP | 3643106 A1 | 4/2020 |
| JP | 2016195405 A | 11/2016 |
| KR | 20130045382 A | 5/2013 |
| KR | 20150043531 A | 4/2015 |
| KR | 102195831 B1 | 12/2020 |
| KR | 102503731 B1 | 2/2023 |
| WO | 2004066077 A2 | 8/2004 |
| WO | 2013010508 A1 | 1/2013 |
| WO | 2015060959 A1 | 4/2015 |

* cited by examiner

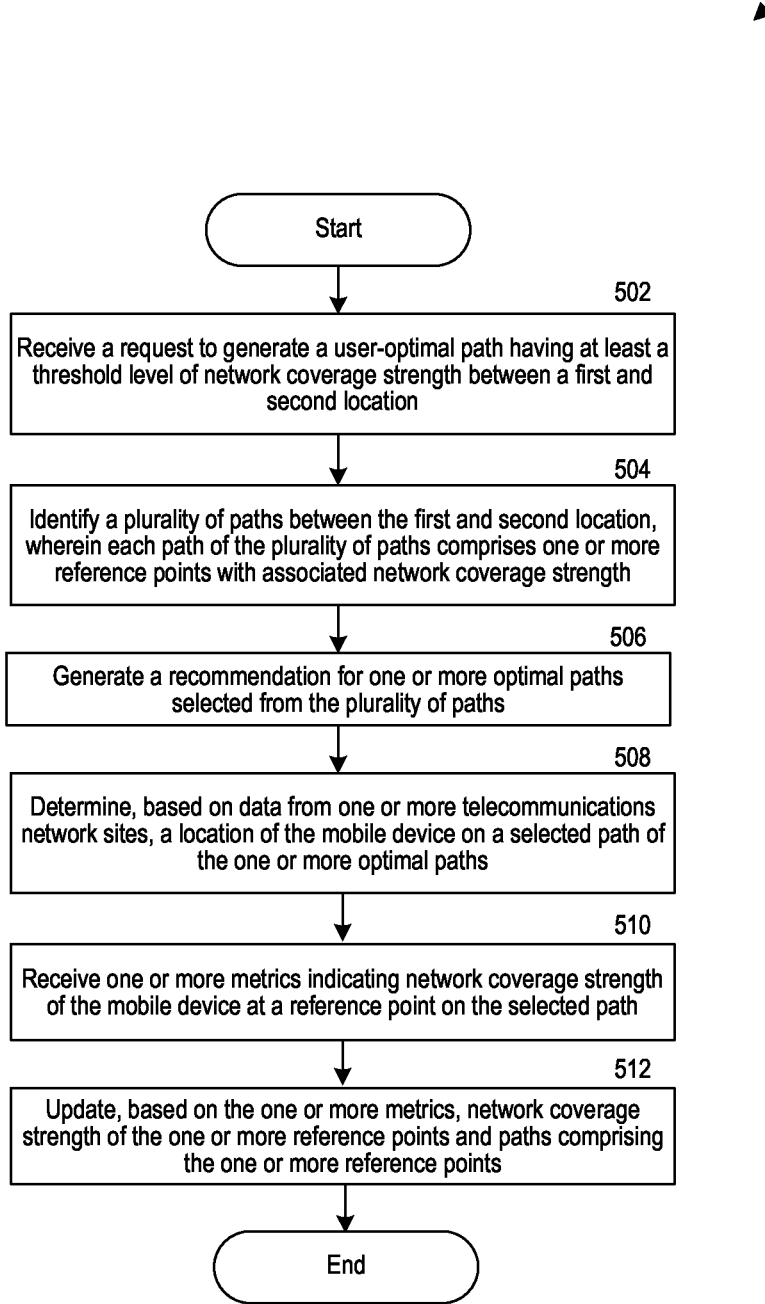

500

Start

502

Receive a request to generate a user-optimal path having at least a threshold level of network coverage strength between a first and second location

504

Identify a plurality of paths between the first and second location, wherein each path of the plurality of paths comprises one or more reference points with associated network coverage strength

506

Generate a recommendation for one or more optimal paths selected from the plurality of paths

508

Determine, based on data from one or more telecommunications network sites, a location of the mobile device on a selected path of the one or more optimal paths

510

Receive one or more metrics indicating network coverage strength of the mobile device at a reference point on the selected path

512

Update, based on the one or more metrics, network coverage strength of the one or more reference points and paths comprising the one or more reference points End

*FIG. 5*

IDENTIFYING TELECOMMUNICATIONS NETWORK PERFORMANCE ON ROADWAYS

BACKGROUND

A telecommunications network is established via a complex arrangement and configuration of many cell sites that are deployed across a geographical area. For example, there can be different types of cell sites (e.g., macro cells, micro-cells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As remote device usage continues to rise at an impressive rate, there are often many people using applications requiring network connectivity enroute or in remote locations, such as in places where the wireless edge of the telecommunications network has limited or no capacity. As a result, most end consumers have to contend with issues of travelling with little-to-no network coverage and telecommunications networks have to contend with issues of providing network connectivity over a wide area of land where end consumers are likely to travel.

BRIEF DESCRIPTION OF THE DRAWINGS

Detailed descriptions of implementations of the present invention will be described and explained through the use of the accompanying drawings.

FIG. 5 is a flow diagram illustrating a process of identifying network performance on paths to enhance a customer's experience with a telecommunications service provider.

Figure 1:
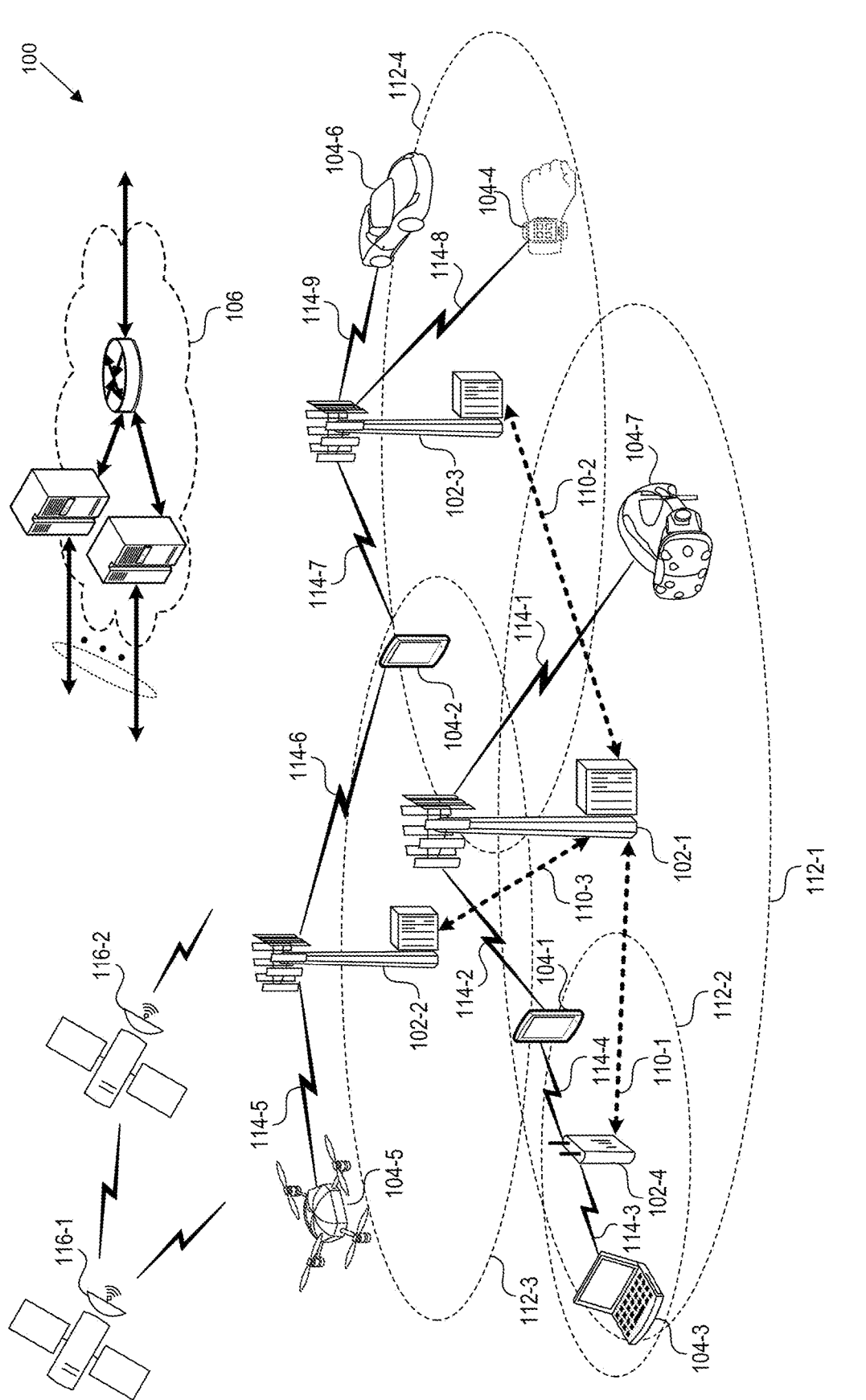
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Reliable and uninterrupted connectivity during travel to and from different locations is critical for consumers in many contexts. Consumers often require continual access to a network in order to be able to perform time-critical actions. For example, disaster response teams and emergency responders require reliable and consistent connectivity in order to coordinate efforts, communicate with hospitals, police forces, fire stations, or other emergency service providers in real time, and to be able to receive instructions from supervisors. Transportation operators such as drivers, pilots, and ship captains also need to have connectivity for navigation purposes as well as to receive real-time updates regarding weather or traffic conditions in order to keep passengers safe. Such transportation operators also require connectivity to be able to report progress, route changes, and provide delivery documentation. Similarly, average consumers also often need access to information online to navigate unfamiliar roads among other tasks.

While reliable and consistent connectivity in the course of travel is important for many consumers, there are many challenges to planning travel in order to meet one's connectivity needs. For example, consumers lack information from service providers regarding current and historic network coverage along specific paths and potential limitations users may encounter along the way. For many service providers, ensuring reliable and uninterrupted connectivity along a user's path is an equally difficult task because of varying and unique needs of different users (e.g., emergency response vehicle operators, commuters, etc.) as well as different technologies (e.g., different user equipment, different carriers, etc.) which makes it difficult to predict a user's experience throughout their trip. For example, a hiker might require enough connectivity to determine their location during the course of a new route, while a student or business professional might require better connectivity for video conferencing or cloud services to access documents. Thus, it is often not possible for a user to plan their travel to optimize for their unique set of connectivity needs.

Accordingly, a mechanism is desired that would enable end consumers and service providers to easily determine a user-optimal path from one location to another. One mechanism to enable determination of a user-optimal path can include identifying, based on historic network performance data, a plurality of paths to a user's planned destination having a threshold network performance measure, and generating recommendations for optimal paths based on user preferences and network performance at reference points on the path. Other aspects, such as a mode of transportation or the telecommunications service provider of the user, can also be considered to recommend a user-optimal path. Additionally, when a user is determined to be on a recommended path, a system can be configured to update network performance data based on the user's experience, e.g., at each reference point on the path.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-toeverything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
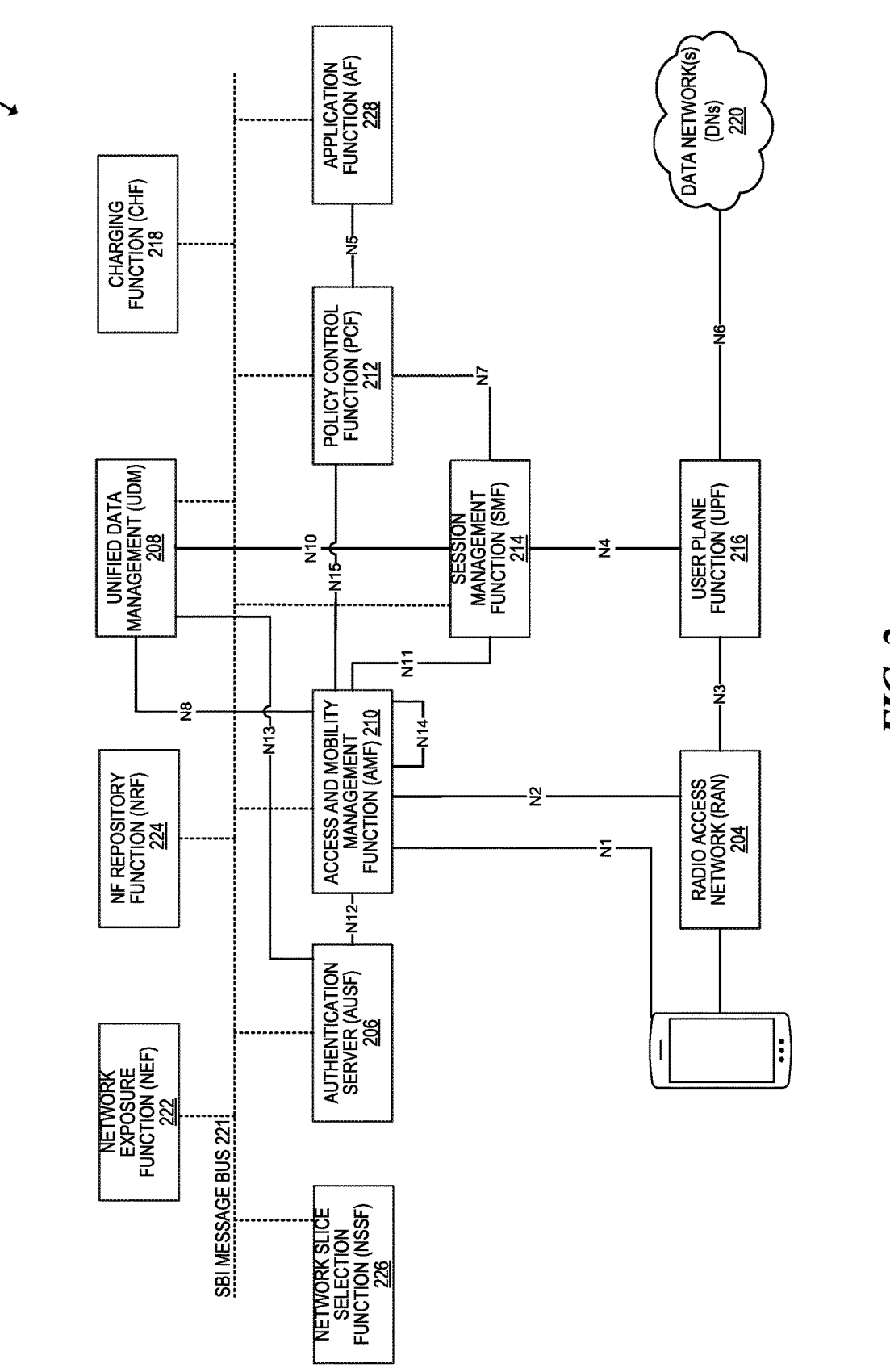
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Suitable Computing Environments

Figure 3:
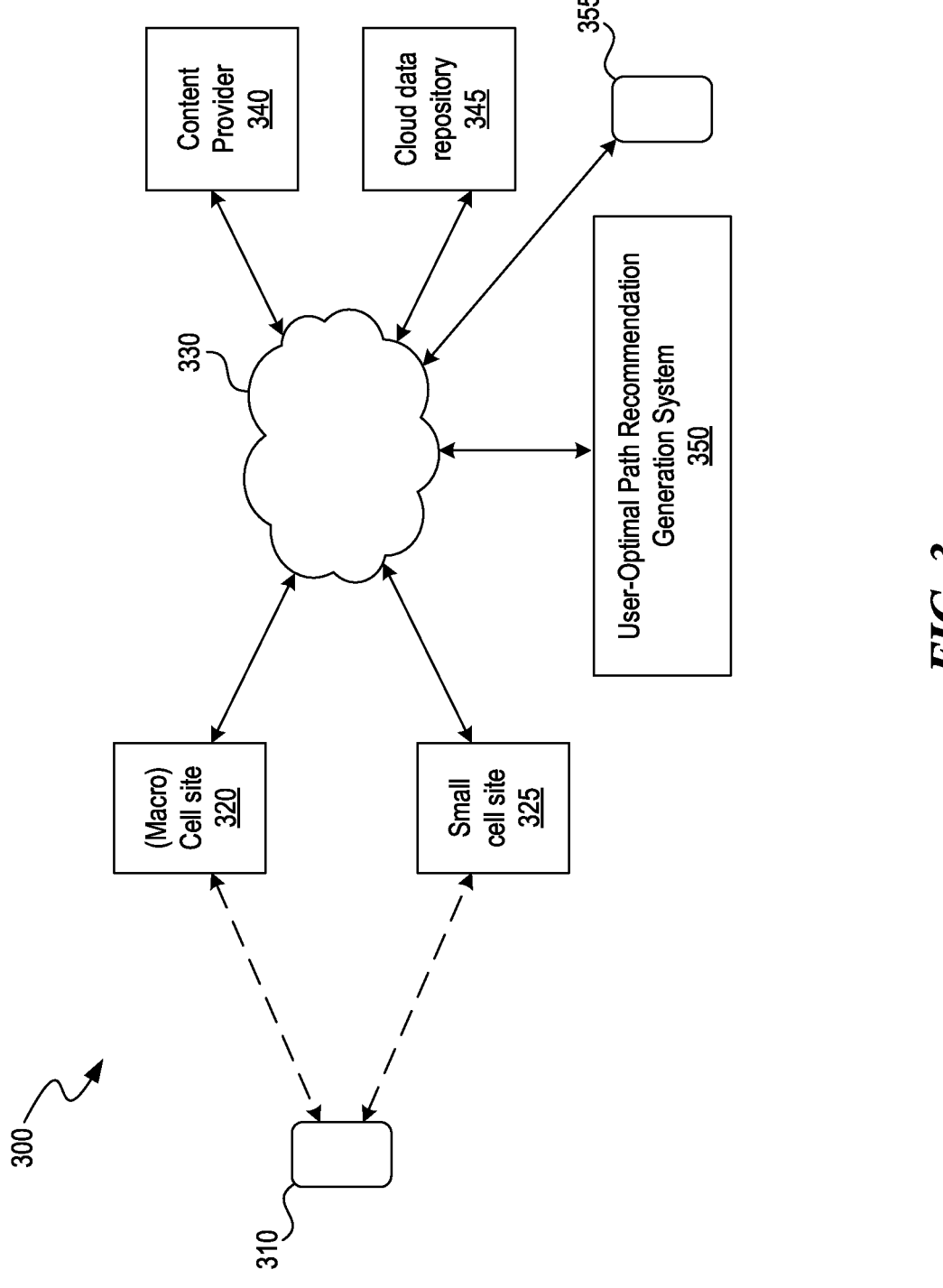
FIG. 3 is a block diagram illustrating a suitable computing environment within which to identify telecommunications network performance on roadways.

FIG. 3 is a block diagram illustrating a suitable computing environment within which to identify telecommunications network performance on roadways. As described herein, computing environment 300 of FIG. 3 can be used to generate recommendations for user-optimal paths such as paths that would have a level of network performance to suit the needs of a user associated with a user device (e.g., a customer). In one example, a suitable path for a user is a path that provides a threshold level of network performance (e.g., connectivity) to a user's device (e.g., user device(s) 310) along a route from one place to another. Computing environment 300 can include one or more user device(s) 310, one or more cell-sites 320 and 325, telecommunications network 330, content provider 340, cloud data repository 345, one or more other user devices 355, and user-optimal path recommendation generation system 350.

User device(s) 310, such as mobile devices or user equipment (UE) associated with users (such as mobile phones (e.g., smartphones), tablet computers, laptops, and so on), Internet of Things (IoT) devices, vehicles (e.g., smart vehicles), devices with sensors, and so on, can be configured to receive and transmit data, stream content, and/or perform other communications or receive services over a telecommunications network 330, which is accessed by the user device 310 over one or more cell sites 320, 325. For example, the mobile device 310 accesses a telecommunication network 330 via a cell site at a geographical location that includes the cell site, in order to transmit and receive data (e.g., stream or upload multimedia content) from various entities, such as a content provider 340, cloud data repository 345, and/or other user devices 355 on the network 330 and via the cell site 320.

The cell sites can include macro cell sites 320, such as base stations, small cell sites 325, such as picocells, microcells, or femtocells, and/or other network access component or sites. The cell cites 320, 325 can store data associated with their operations, including data associated with the number and types of connected users, data associated with the provision and/or utilization of a spectrum, radio band, frequency channel, and so on, provided by the cell sites 320, 325, and so on. The cell sites 320, 325 can monitor their use, such as the provisioning or utilization of physical resource blocks (PRBs) provided by a cell site physical layer in LTE network; likewise the cell sites can measure channel quality, such as via channel quality indicator (CQ) values, etc.

According to some embodiments, a user (e.g., consumer) at and/or associated with user device(s) 310 can plan to travel from a first location (e.g., a current location of the user device) and a second location (e.g., a desired destination of the user), such as via a user interface provided on user device(s) 310. User device(s) 310 can transmit, for example responsive to user input on a user interface of user device(s) 310, a request for generating a user-optimal path. The request can be transmitted via one or more cell sites 320, 325 and/or via telecommunications network 330. User-optimal path recommendation generation system 350 can receive the request to generate a user-optimal path having at least a threshold level of network performance (e.g., network coverage strength) between the first location and the second location.

User-optimal path recommendation generation system 350 can obtain (e.g., receive from a database or device, access from storage) data including historic network performance data, user preferences, network performance at reference points of each path, a mode of transportation for traversing each path, and/or a telecommunications service provider associated with the user device. User-optimal path recommendation generation system 350 can then use the received data to generate a recommendation for one or more optimal paths selected for the user and/or user device(s) 310. Additionally, according to some examples, user-optimal path recommendation generation system 350 obtains one or more metrics indicating network performance of a user device on a path (e.g., at a reference point on a path) and update, based on the one or more metrics, network performance data of the reference point or paths comprising the reference point.

User-optimal path recommendation generation system 350 can use data from telecommunications network 330 to determine historic network performance. For example, components provided by the telecommunications network 330 monitor and/or measure the operations and transmission characteristics of the cell sites 320, 325 and other network access components. For example, the telecommunications network 330 provides a network monitoring system, via a network resource controller (NRC) or network performance and monitoring controller, or other network control component, to measure and/or obtain the data associated with the utilization of cell sites 320, 325 when data is transmitted within a telecommunications network. In some examples, user device(s) 310 or cell sites 320, 325 can monitor and/or measure transmission characteristics and transmit them to user-optimal path recommendation generation system 350 via telecommunications network 330.

FIG. 3 and the discussion herein provide a brief, general description of a suitable computing environment 300 in which the user-optimal path recommendation generation system 350 can be supported and implemented. Although not required, aspects of the user-optimal path recommendation generation system 350 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multiprocessor systems, microprocessor-based or programmable consumer electronics, set-top boxes, network PCs, minicomputers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 310 and/or the cell sites 320, 325 can include network communication components that enable the devices to communicate with remote servers or other portable electronic devices by transmitting and receiving wireless signals using a licensed, semi-licensed, or unlicensed spectrum over communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 330 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the user-optimal path recommendation generation system 350 will now be described.

Examples of Identifying Telecommunications Network Performance on Roadways

Figure 4:
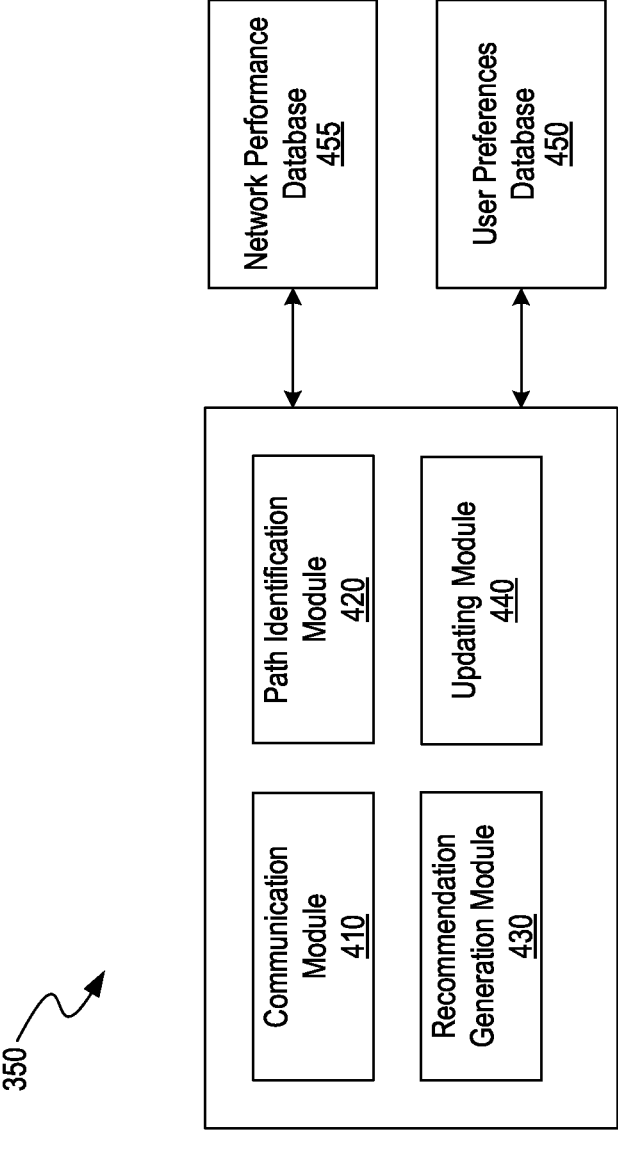
FIG. 4 is a block diagram illustrating the components of an exemplary user-optimal path recommendation generation system.

FIG. 4 is a block diagram illustrating the components of an exemplary user-optimal path recommendation generation system 350. the user-optimal path recommendation generation system 350 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the user-optimal path recommendation generation system 350 includes a communication module 410, a path identification module 420, a recommendation generation module 430, an updating module 440, each of which is discussed separately below.

Communication Module

Communication module 410 of user-optimal path recommendation generation system 350 can include software and/or hardware components allowing for the transmission and/or receipt of information between two or more devices. Communication module 410 can include a wireless communication module, such as a cellular radio or Wi-Fi antenna, to allow for communication over wireless networks, and/or can additionally or alternatively include a network card (e.g., a wireless network card and/or a wired network card) that is associated with software to drive the card.

The communication module 410 is configured and/or programmed (e.g., via the above-mentioned techniques) to interface between a user device (e.g., udevice(s) 310, one or more other user devices 355), cell sites (e.g., cell sites 320, 325), content provider (e.g., content provider 340), cloud data repository (e.g., cloud data repository 345) such as via a network (e.g., network 330), to receive and transmit data. When communication module 410 receives data, the module can pass on relevant portions of data to different modules of the user-optimal path recommendation generation system 350. Communication module 410 can be configured and/or programmed to receive requests from users via user equipment for generating paths from one location to another and/or network performance data and pass such information to other modules to generate recommendations for paths that are optimal for a user.

As described herein, communication module 410 can receive a request to generate a user-optimal path, e.g., from a first location to a second location. For example, communication module 410 receives the request from a user via user equipment associated with the user (e.g., user device(s) 310). As described herein, user equipment can include a mobile device of the user, a vehicle, such as a smart vehicle, IoT devices, and/or the like. The request can be to generate a user-optimal path having at least a threshold level of network performance, such that a user can travel from the first location to the second with reliable and/or consistent network performance (e.g., network coverage). In response to receiving the request, the communication module 410 can pass at least a portion of the data included in the request to path identification module 420, where paths from the first to second location are identified. For example, the communication module transfers the first and second locations to the path identification module 420.

The communication module 410 can also receive data from databases (e.g., local or remote storage) to identify paths and generate recommendations for optimal paths for a user. For example, communication module 410 receives data from network performance database 455 and/or user preferences database 450 and can pass at least a portion of data obtained (e.g., collected/received/accessed, etc.) from network performance database 455 and/or user preferences database 450 to other modules of user-optimal path recommendation generation system 350, such as path identification module 420 and/or recommendation generation module 430.

In one example, the path identification module 420 can receive data from network performance database 455 via communication module 410, such as records indicating metrics of different user equipment's network performance at a given time and/or associated with a specific location (e.g., reference point), such as historic network performance indicator data. The records can include network coverage data associated with specific reference points, RF signals, distance between the user equipment (e.g., mobile device) and at least one telecommunications network site (e.g., cell cites), strength of signal received by the user equipment, quantity of data used by the mobile device, type of mobile device, a mode of transportation, a telecommunications service provider associated with the user equipment or any combination thereof. The records can also include network performance parameters such as network strength, e.g., call drop rate, minimum bandwidth available, etc. Path identification module 420 and/or recommendation generation module 430 can use the obtained data to identify a plurality of paths a user can take and recommend a particular path based on one or more parameters.

As described herein, communication module 410 can also obtain data from user preferences database 450, such as data associated with specific users regarding their preferences regarding travel or connectivity to recommend paths that conform to a specific user's needs. The communication module 410 can then pass at least a portion of the data obtained to the recommendation generation module 430 to generate recommendations for paths that are optimal for a user based on their preferences.

Path Identification Module

Path identification module 420 of user-optimal path recommendation generation system 350 can identify one or more paths from a first location to a second location. For example, user-optimal path recommendation generation system 350 receives a request (e.g., via communication module 410) to generate a user-optimal path, such as a path having at least a threshold level of network performance (e.g., network coverage, call drop rate, etc.). In one example, the request can be transmitted from user equipment when a user indicates via the user equipment a first location (e.g., a current location) and/or a second location (e.g., a desired destination location) such as through an interface (e.g., via a display, via an application, via a website, etc.) on the user equipment.

Communication module 410 can pass at least a portion of the request (e.g., the first and/or second location, the threshold level of network performance desired) to the path identification module 420 such that the path identification module can identify paths from the first location to the second location. In some examples, the path identification module 420 can identify any and all possible paths between the first and second location. Alternatively or additionally, the path identification module 420 can identify paths between the first and second location having at least a threshold level of network performance. For example, the path identification module 420 identifies paths between the first and second location having at least a threshold level of network performance based on historic network performance indicator data.

For example, the path identification module first identifies paths from a first to second location where each path is comprised of a plurality of reference points. The path identification module 420 can subsequently determine associated network performance indicators (e.g., representative measures of network performance) at each reference point and determine whether or not the indicators indicate that the network performance corresponds to (e.g., exceeds or does not exceed) the threshold level. The path identification module 420 can pass information identifying the one or more paths having at least a threshold level of network performance to the recommendation generation module 430 which can select user-optimal paths, e.g., based on user preferences.

In some examples, the communication module 410 can obtain network performance data from network performance database 455 and pass at least a portion of the data to path identification module 420. Path identification module 420 can then use the obtained data to identify paths having at least the threshold level of network performance. As described herein, the data obtained from the network performance database 455 can include metrics for network performance relevant to the user's request. For example, the metrics include network performance at reference points included along paths from the first location to the second location.

The metrics can include network coverage, network strength, e.g., call drop rate, minimum bandwidth available, etc. For example, the metrics include Reference Signal Received Quality (RSRQ), Reference Signal Received Power (RSRP), signal-to-noise ratio (SNR), bandwidth, and/or the like The records can also include network coverage data associated with specific reference points, RF signals, distance between the user equipment (e.g., mobile device) and at least one telecommunications network site (e.g., cell cites), strength of signal received by the user equipment, quantity of data used by the mobile device, type of mobile device, a mode of transportation, a telecommunications service provider associated with the user equipment or any combination thereof.

In some examples, the network performance database can include a plurality of records each associated with a user's user equipment session at a cell site or a reference point. For example, the record includes information that identifies the site, such as a site ID, one or more network performance metrics, the service provider, the Public Land Mobile Network (PLMN), the frequency channel, band, the user, the user equipment, and/or the like. The user-optimal path recommendation generation system 350 can obtain all or relevant records (e.g., records associated with the type of user equipment the user is using, the service provider the user equipment is utilizing, the bandwidth the user is requesting throughout travel, the cell sites that correspond to reference points, e.g., points on paths from the first to second location).

Alternatively or additionally, the user-optimal path recommendation generation system 350 can request metrics relevant to the request (e.g., metrics associated with the type of user equipment the user is using, the service provider the user equipment is utilizing, the bandwidth the user is requesting throughout travel, the cell sites that correspond to reference points, e.g., points on paths from the first to second location) and the communication module 410 can receive a representative value of the metrics as the network performance indicator at each reference point. A representative value includes for example, an average or median value among the records through all recorded history or through a specific time interval.

As described herein, the network performance indicators (e.g., network performance metrics) can be associated with reference points of the paths. The associated network performance indicators can be metrics based on historic network performance specific to different times of day, day of week, special events, weather-related events, or any combination thereof. For example, if a user requests a path during 5 PM on a Tuesday during a holiday during a snowy day, for a reference point on an identified path, the associated network performance indicator is based on (e.g., an average or median, etc.) network performance measured historically (e.g., previously) in the afternoon, on Tuesdays, during the same holiday, when the weather was snowy, or a combination of the like at the reference point.

Recommendation Generation Module

The recommendation generation module 430 can receive information identifying the one or more paths having at least a threshold level of network performance from path identification module 420. For example, recommendation generation module 430 receives an identifier for the path, such as a path ID, or alternatively can receive a list (or other data structure) comprising identifiers for the reference points that make up the path. Alternatively or additionally, the path identification module 420 can pass the network performance indicator(s) and other information associated with each reference point to recommendation generation module 430.

The recommendation generation module 430 can generate a recommendation for one or more optimal paths selected from the plurality of paths (e.g., from path identification module 420). For example, the module generates a recommendation based on a plurality of user preferences, network performance indicators at reference points of each path, a mode of transportation for traversing each path, a telecommunications service provider associated with the mobile device, and/or the like. The plurality of user preferences can be obtained from the user preferences database 450.

The user preferences database 450 can store information (e.g., based on user input or based on learned characteristics from previous trips of a user) regarding a user's specific needs or preferences during travel which can be used to recommend optimal routes from a plurality of paths from a first to second location. Preferences can include a user's preferred type of network coverage, preference for paths having the shortest distance, faster travel time, avoiding traffic, scenic routes, avoiding tolls, avoiding highways, pedestrian friendly routes, route that minimizes fuel consumption or reduces carbon emissions, call drop rate, minimum bandwidth and/or the like.

User preferences can be determined by the system over time such as based on attributes of previous path selections by the user. Generating the recommendation for one or more optimal paths selected from the plurality of paths can include selecting paths having attributes similar to attributes of the previous path selections. For example, if a user mostly selects paths with shorter travel time over network coverage strength, the recommendation generation module selects one or more paths from the identified paths having the shortest travel time.

User preferences can also be determined by the system based on user input via the user equipment. For example, the user equipment prompts the user and/or the user can input via the user equipment information regarding preferences. The user input can indicate the metrics the user finds important, a minimum and/or maximum value for a network performance indicator, and/or can be indicative of a type of coverage the user is interested in. In one example, the system prompts the user (e.g., via an interface of the user equipment) what purpose the user needs network connectivity for, such as for streaming, calls, texting, etc. A first user might require that a call drop rate be within a certain range, whereas for as second user, a certain minimum bandwidth might be important (e.g., to stream content). The system can identify paths having metrics that fall within the indicated or determined parameters.

According to some embodiments, some or all of the user preferences can be stored as part of a user profile associated with the user equipment (e.g., mobile device) in the user preferences database 450. The user preferences can be stored in a data structure containing an identifier of the user equipment. When a request is received by user-optimal path recommendation generation system 350 from the user equipment of the user, the communication module 410 can obtain user preferences by transmitting a request to the user preferences database 450 including the identifier of the user equipment. The database can transmit the user profile including the user preferences responsive to the request.

Recommendation generation module 430 can pass the one or more optimal paths to communication module 410, which can transmit a recommendation including information regarding the paths (e.g., path identifier, reference points of the path, etc.) to the user equipment, e.g., for display at a user interface of the user equipment (e.g., mobile device). Communication module 410 can receive, via the user interface of the mobile device, an indication of a user selection of a first path of the one or more recommended optimal paths.

Updating Module

According to some examples, the user-optimal path recommendation generation system 350 can further include an updating module 440. Updating module can be used to update network performance data and path information. For example, the updating module 440 determines that the user equipment is on a path, such as a selected path of the user, and receive one or more metrics for network performance of the user equipment at a reference point. The updating module can then update network performance metrics associated with the reference point and/or one or more paths including the reference point, e.g., at the network performance database 455.

Communication module 410 can determine a location of the user equipment (e.g., mobile device) on the selected path. For example, the communication module receives data from a cell site identifying the location of the cell site, the user equipment, and one or more metrics such as RSRP, RSRQ, etc. indicating network performance. The communication module 410 can transmit the data to the updating module 440, which can parse the information and prompt the communication module 410 to transmit the record to the network performance database 455. According to some examples, the user equipment may not be able to access a cell site at a reference point. The user equipment can record a location or estimated location, measurements at the reference point, etc. and transmit the information at the next available cell site. In some examples, the updating module can be able to determine a location of the user equipment by performing triangulation.

Flow Diagram

FIG. 5 is a flow diagram illustrating a process of identifying network performance on paths to enhance a customer's experience with a telecommunications service provider. Process 500 begins at block 502 where a system (e.g., such as user-optimal path recommendation generation system 350) receives a request to generate a user-optimal path having at least a threshold level of network coverage strength between a first and second location (as discussed above in reference to the communication module 410). At blocks 504, process 500 includes identifying a plurality of paths between the first and second location, wherein each path of the plurality of paths comprises one or more reference points with associated network coverage strength (as discussed above in reference to the path identification module 420). Process 500 then proceeds to block 506 where a system generates a recommendation for one or more optimal paths selected from the plurality of paths (as discussed in reference to the recommendation generation module 430).

At block 508, process 500 determines, based on data from one or more telecommunications network sites, a location of the mobile device on a selected path of the one or more optimal paths. The process proceeds to block 510, where the system receives one or more metrics indicating network coverage strength of the mobile device at a reference point on the selected path. In block 512, the system updates, based on the one or more metrics, network coverage strength of the one or more reference points and paths comprising the one or more reference points (as discussed in reference with updating module 440).

Computer System

Figure 6:
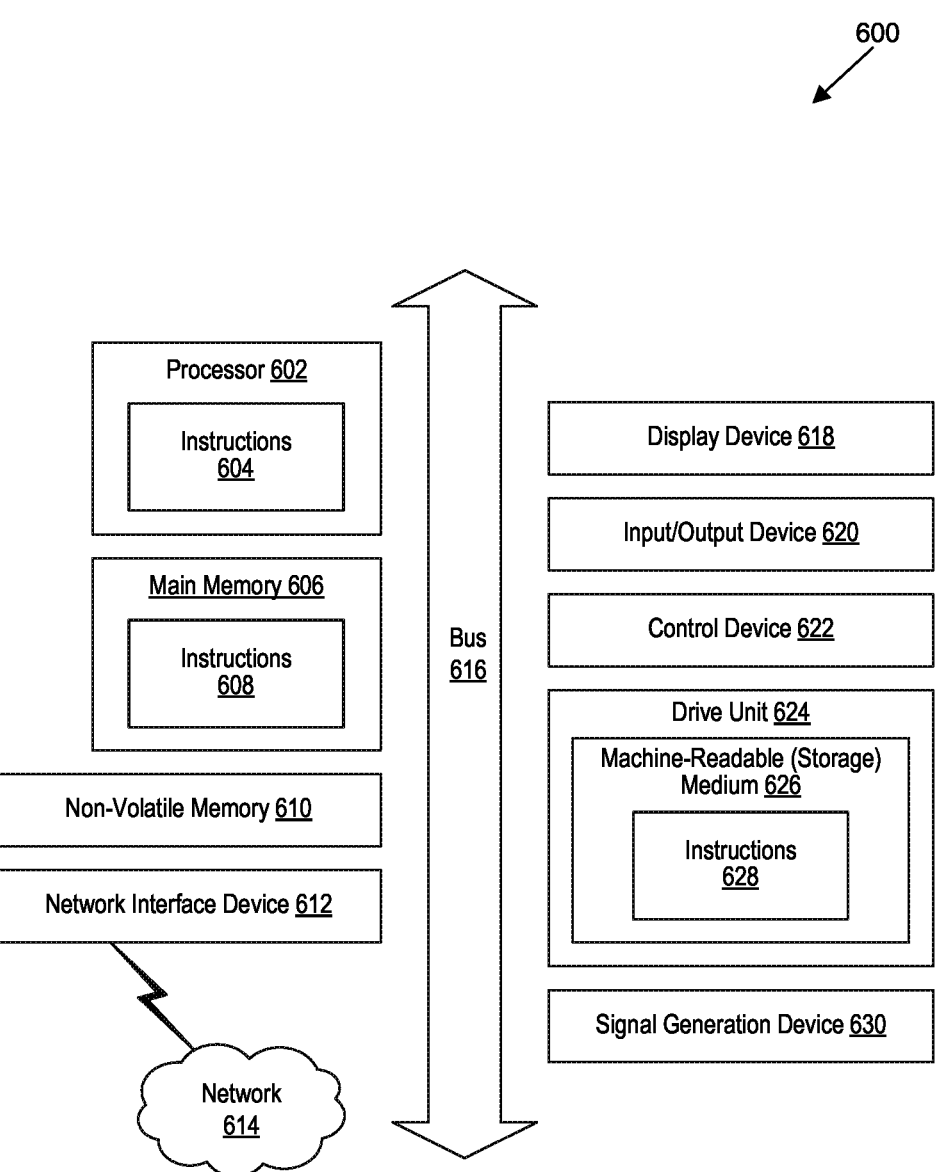
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for identifying network strength on paths to enhance a customer's experience with a telecommunications service provider, the method comprising:

receiving, from a user at a mobile device, a request to generate a user-optimal path having at least a threshold level of network coverage strength between a first location and a second location;

identifying, based on historic network coverage strength data from a network performance database, a plurality of paths between the first location and the second location, wherein each path of the plurality of paths comprises one or more reference points with associated network coverage strength;

generating a recommendation for one or more optimal paths selected from the plurality of paths based on: (1) a plurality of user preferences, (2) network coverage strength at reference points of each path, (3) a mode of transportation for traversing each path, and (4) a telecommunications service provider associated with the mobile device;

determining, based on data from one or more telecommunications network sites, a location of the mobile device on a selected path of the one or more optimal paths;

receiving, from the mobile device via the one or more telecommunications network sites, one or more metrics indicating network coverage strength of the mobile device at a reference point on the selected path when the mobile device is at the reference point; and updating, based on the one or more metrics, the historic network coverage strength data by transmitting the network coverage strength of the one or more reference points and one or more paths comprising the one or more reference points for inclusion into the network performance database.

2. The method of claim 1, wherein the method further comprises:

transmitting, to the mobile device, the recommendation for display at a user interface of the mobile device; and receiving, via the user interface of the mobile device, an indication of a user selection of a first path of the one or more recommended optimal paths.

3. The method of claim 1, wherein receiving the one or more metrics indicating network coverage strength comprises receiving a set of records associated with the mobile device, wherein the set of records includes: RF signals, distance between the mobile device and at least one telecommunications network site, strength of signal received by the mobile device, quantity of data used by the mobile device, type of mobile device, or any combination thereof.

4. The method of claim 1, wherein the associated network coverage strength is based on historic network coverage data specific to: a time of day, a day of week, special events, weather-related events, or any combination thereof.

5. The method of claim 1, wherein the plurality of user preferences comprises preferences for paths with shortest distance, fastest travel time, for avoiding traffic and/or tolls, and/or paths that minimizes fuel consumption or reduces carbon emissions, or any combination thereof.

6. The method of claim 1, further comprising:

determining one or more user preferences of the plurality of user preferences based on attributes of previous path selections by the user, wherein generating the recommendation for one or more optimal paths selected from the plurality of paths comprises selecting paths having attributes similar to attributes of the previous path selections.

7. The method of claim 1, wherein the plurality of user preferences comprises a type of network coverage required during traversal of a path.

8. The method of claim 1, wherein the plurality of user preferences are determined based on user input via the mobile device.

9. The method of claim 1, wherein the plurality of user preferences are obtained from a user profile associated with the mobile device stored at a database.

10. One or more non-transitory computer-readable media containing instructions which when executed by a processor, perform a method for identifying network performance on paths, the method comprising:

receiving, from a user at a user equipment, a request to generate a user-optimal path having at least a threshold level of network performance from a first location to a second location;

identifying, based on historic network performance indicator data from a network performance database, a plurality of paths from the first location to the second location, wherein each path of the plurality of paths comprises one or more reference points with associated network performance indicators;

generating a recommendation for one or more optimal paths selected from the plurality of paths based on (1) a plurality of user preferences, (2) network performance indicators at reference points of each path, (3) a mode of transportation for traversing each path, and (4) a telecommunications service provider associated with the user equipment;

receiving, from the user equipment via one or more telecommunications network sites, one or more metrics indicating network performance of the user equipment at a reference point on a selected path when the user equipment is at the reference point; and updating, based on the one or more metrics, the historic network performance indicator data by transmitting the network performance of the user equipment at the reference point on the selected path for inclusion into the network performance database.

11. The one or more non-transitory computer-readable media of claim 10, wherein the method further comprises:

determining, based on data from the one or more telecommunications network sites, a location of the user equipment on the selected path of the one or more optimal paths.

12. The one or more non-transitory computer-readable media of claim 10, wherein the method further comprises:

transmitting, to the user equipment, the recommendation for display on a user interface of the user equipment; and receiving, from the user equipment, an indication of a user selection of a first path of the one or more optimal paths.

13. The one or more non-transitory computer-readable media of claim 10, wherein receiving one or more metrics indicating network performance indicator comprises receiving a set of records associated with the user equipment, wherein the set of records includes: RF signals, distance between the user equipment and at least one telecommunications network site, strength of signal received by the user equipment, quantity of data used by the user equipment, type of user equipment, or any combination thereof.

14. The one or more non-transitory computer-readable media of claim 10, wherein the associated network performance indicator is based on historic network coverage data specific to time of day, day of week, special events, weather-related events, or any combination thereof.

15. The one or more non-transitory computer-readable media of claim 10, wherein the plurality of user preferences comprises preferences for paths with shortest distance, fastest travel time, for avoiding traffic and/or tolls, and/or paths that minimizes fuel consumption or reduces carbon emissions, or any combination thereof.

16. A system for identifying network strength on paths to enhance a customer's experience with a telecommunications service provider, the system comprising:

one or more processors; and one or more non-transitory computer-readable media storing instructions that, when executed by the one or more processors, cause operations comprising:

receiving, from a user at a user equipment, a request to generate a user-optimal path having at least a threshold level of network performance from a first location to a second location;

identifying, based on historic network performance indicator data from a network performance database, a plurality of paths from the first location to the second location, wherein each path of the plurality of paths comprises one or more reference points with associated network performance indicators;

generating a recommendation for one or more optimal paths selected from the plurality of paths based on (1) a plurality of user preferences, (2) network performance indicators at reference points of each path, (3) a mode of transportation for traversing each path, and (4) a telecommunications service provider associated with the user equipment;

receiving, from the user equipment via one or more telecommunications network sites, one or more metrics indicating network performance of the user equipment at a reference point on the selected path when the user equipment is at the reference point; and updating, based on the one or more metrics, the historic network data by transmitting the network performance of the user equipment at the reference points for inclusion into the network performance database.

17. The system of claim 16, wherein the one or more non-transitory computer-readable media further cause operations comprising:

transmitting, to the user equipment, the recommendation for display on a user interface of the user equipment; and receiving, from the user equipment, an indication of a user selection of a first path of the one or more optimal paths.

18. The system of claim 16, wherein the one or more non-transitory computer-readable media further cause operations comprising:

determining, based on data from one or more telecommunications network sites, a location of the user equipment on a selected path of the one or more optimal paths.

19. The system of claim 16, wherein the associated network performance indicator is based on historic network coverage data specific to time of day, day of week, special events, weather-related events, or any combination thereof.

20. The system of claim 16, wherein the plurality of user preferences comprises preferences for paths with shortest distance, fastest travel time, for avoiding traffic and/or tolls, and/or paths that minimizes fuel consumption or reduces carbon emissions, or any combination thereof.

* * * * *